Patented Sept. 21, 1948

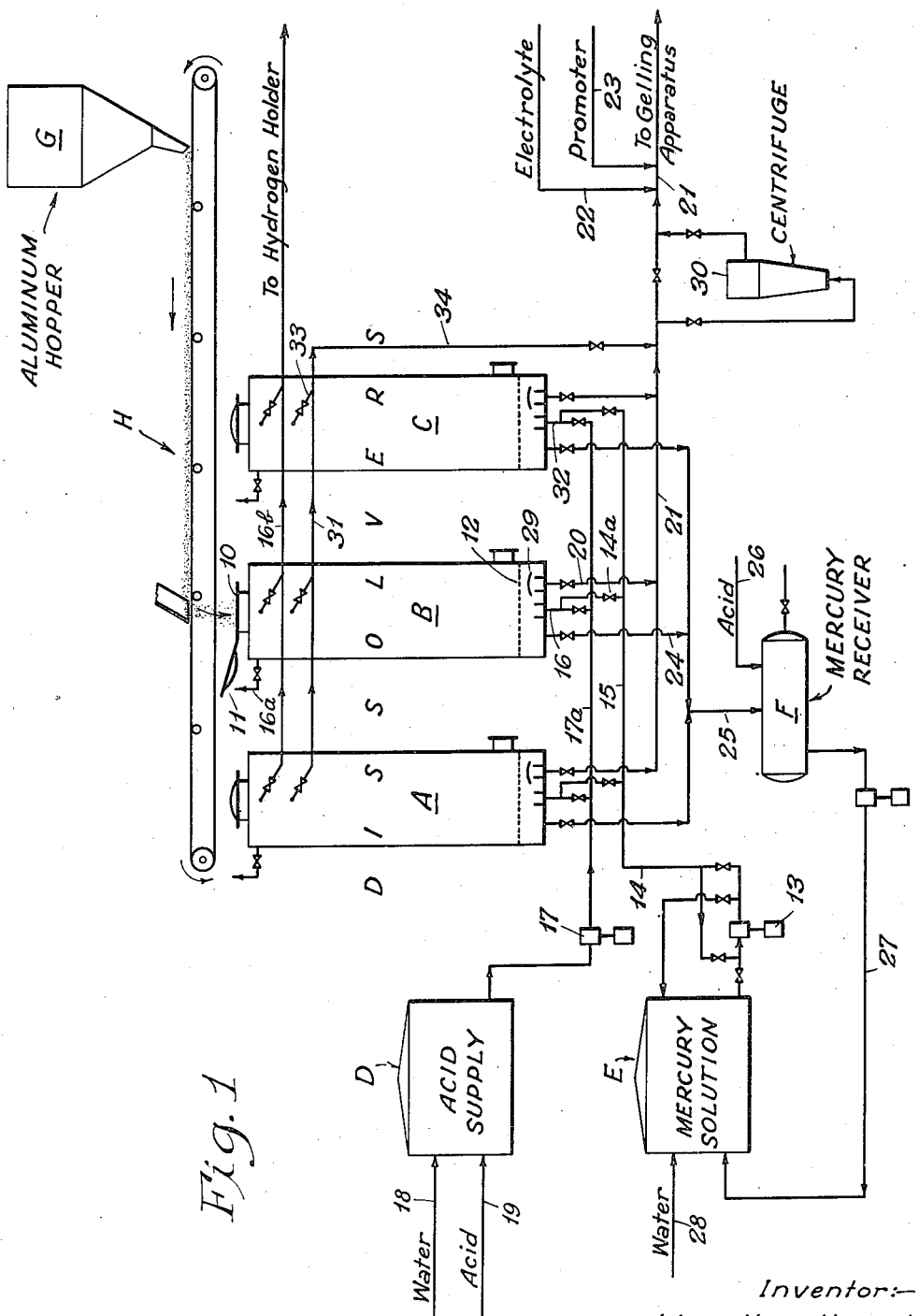

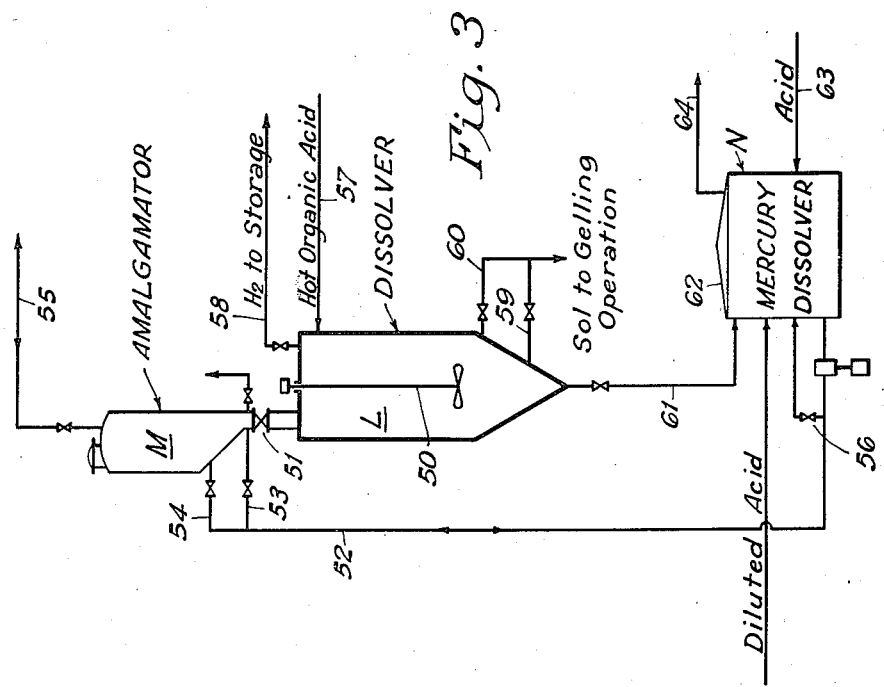
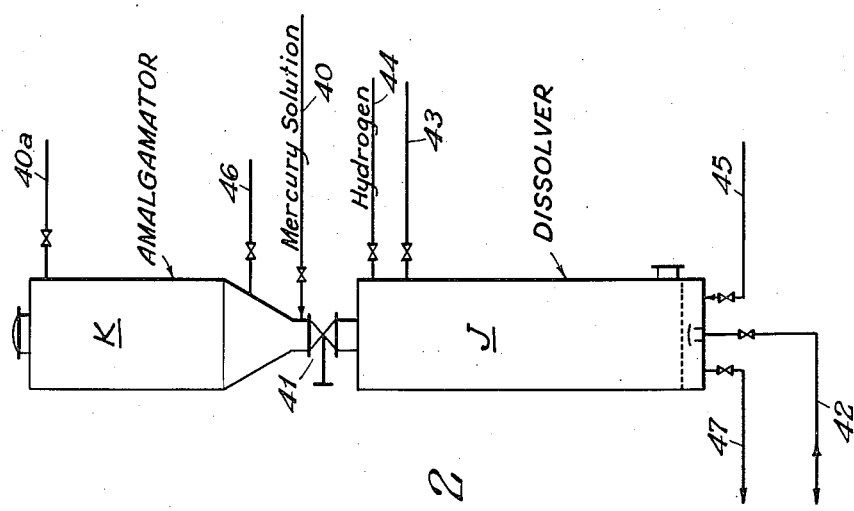

2,449,847

UNITED STATES PATENT OFFICE 2,449,847

MANUFACTURING ALUMINA GEL FROM AMALGAMATED ALUMINUM

Llewellyn Heard, Hammond, Ind., assignor to Standard Oil Company, Chicago, Ill., a corporation of Indiana Application February 21, 1945, Serial No. 579,123

6 Claims. (Cl. 252—317)

This invention relates to a process of making alumina sol and gel and particularly to the manufacture of alumina gel catalysts useful in the conversion of hydrocarbons. The invention relates still more particularly to improvements in the manufacture of alumina gel catalysts by the gelation of alumina sols produced from amalgamated aluminum metal, according to the general method described in my United States Patent Reissue 22,196, issued October 6, 1942.

The object of this invention is to produce alumina gels rapidly and cheaply on a commercial scale. More specific objects are the provision of methods for handling large quantities of aluminum metal, amalgamating the aluminum metal, and producing a continuous supply of fresh alumina sol substantially without interruption for the gelling of a stream of sol continuously. Still more specific objects of the invention are the preparation of alumina sol at a more rapid rate than heretofore with better utilization of peptizing acid and better utilization and recovery of mercury in amalgamation. My invention is illustrated by drawings which show diagrammatically in Figure 1 an apparatus for carrying out the process. Figure 2 illustrates a simplified form of apparatus adapted to producing a continuous stream of alumina sol and Figure 3 shows an alternative form of apparatus for intermittent sol preparation.

Referring to Figure 1, A, B and C are dissolvers for metallic aluminum; D is an acid supply; E is a mercury solution supply; F is a mercury receiver; G is a hopper to supply metallic aluminum to the process; while H is a belt conveyor to carry the aluminum metal to the dissolvers. Only three dissolvers are shown, but the number may be considerably greater to facilitate smooth operation.

In carrying out the process, metallic aluminum in the form of turnings, sheet, wire, buttons, spelter or crimped sheet extruded or rolled, or in other attenuated form presenting a large surface, is supplied by hopper G and conveyor H to one of the dissolvers which is then substantially filled with the metal. Sheet metal of 20 to 40 U. S. gage is satisfactory. Thus dissolver B is charged thru opening 10 and, when filled, the cover 11 is attached making a gas-tight seal. The charge of aluminum resting on false bottom 12 is then amalgamated by pumping in a solution of a mercury salt from tank E by pump 13 and lines 14, 15 and 16. After standing about five minutes, the amalgamation is complete and the amalgamating solution is then drawn off thru the same lines by reversing manifold valves on pump 13. Room temperature, about 60 to 80° F., is satisfactory for the amalgamation reaction.

Too long contact with the mercury solution will lead to excessive solution of aluminum during the amalgamation step accompanied by evolution of hydrogen. This is generally undesirable and care is taken to remove the solution as soon as the desired amalgamation is obtained. Care must also be taken to prevent contact of air with the amalgamated aluminum as oxidation has been found to prevent the proper solution of the metal in the later stages of the process, apparently by producing an insoluble or "unsolable" oxide. Furthermore, access of air may cause combustion of the amalgam and serious fire. When charging the dissolver with mercury solution, the air is expelled thru vent 16a and thereafter the dissolver is connected with hydrogen line 16b to permit escape or ingress of hydrogen. When the mercury solution is withdrawn, the amalgamated aluminum in the dissolver is surrounded by an atmosphere of hydrogen gas drawn in thru line 16b.

The solution employed for amalgamation is conveniently mercuric nitrate or basic mercuric acetate prepared by dissolving mercury in nitric acid or by dissolving mercuric oxide HgO, in acetic acid, respectively. Other salts of mercury may be used for the purpose such as the bichloride, sulfate, etc. The concentration of the mercury solution is suitably about 0.5 to 10 grams of mercury per liter. If desired, however, a still lower concentration of mercury may be used, e. g. about 0.1 gram per liter, and the solution may be allowed to remain on the metallic aluminum to produce the desired alumina sol, sufficient acid being present for the purpose. Where acetic acid or formic acid is used the concentration should be about 2 to 4 per cent. By this method, all the mercury in the solution is deposited as metallic mercury on the aluminum and later recovered.

After the aluminum charge in the dissolver B has been properly amalgamated and the excess mercury solution returned to E, the valve 14a is closed and acid is introduced from supply tank D by pump 17 and lines 17a and 16, sufficient acid being introduced to flood the charge of metal in the dissolver. Adequate space should be left above the metal charge in the dissolver to permit disengagement of hydrogen produced in the reaction. For each ton of aluminum dissolved there is produced about 85,000 cubic feet of hydrogen (NPT). In escaping from the reactor, the hydrogen serves to agitate the solution surrounding the metal and thus facilitates the reaction, particularly when the aluminum metal is employed in a form which provides adequate space around the pieces of metal for movement of the solution. For this reason it is preferred to use aluminum in the form of turnings, crimped wire or sheet, spelter or irregular buttons. If the aluminum is in a form which tends to become compacted in the dissolver, i. e. fine granules or flat sheet, it is desirable to supply additional agitation by means of a mechanical agitator not shown or by blowing with hydrogen or other non-oxidizing gas. I may also recycle the acid upwardly thru the dissolver to supply additional agitation, withdrawing it at the top and forcing it in at the bottom.

The acid solution employed for dissolving metal is suitably a weak organic acid, such as acetic acid or formic acid, in a concentration of about 1 to 4 per cent. The acid can be prepared in tank D by adding water thru line 18 and concentrated acid thru line 19 and then mixing, e. g. by blowing with air or hydrogen or other inert gas. A mixture of acetic and formic acid is quite satisfactory. The alumina sol produced from acetic acid is somewhat more stable than that produced with formic acid and can be handled and stored more readily without gelling. When using a mixture of these acids, a sol of satisfactory stability is obtained. The time required for preparing the sol with a mixed acetic-formic acid (fifty-fifty) is about 10 to 30 minutes when the temperature of the solution is maintained at about 160° F. If the acid is supplied at the desired temperature, the heat of reaction will maintain the temperature in the dissolver so that no additional heating is required to complete the reaction.

The sol, suitably containing about 5–10 per cent of aluminum oxide, is withdrawn thru valved lines 20 and 21 leading to the gelling apparatus. Gelling is effected by introducing into the sol by line 22 an electrolyte, e. g. ammonium carbonate, weak acid such as acetic or formic acid, etc., or other suitable electrolyte. When preparing catalysts it is commonly desirable to add a promoter which is suitably added to the sol in the form of a solution, for example by line 23. Suitable promoters are boric acid, salts of group VI metals, salts of copper, cobalt, vanadium, chromium, molybdenum, nickel or other promoter metal. Ammonium chromate or ammonium molybdate may be added in this way, and when preparing catalysts for hydrogenation or hydroforming hydrocarbons, it is desirable to add sufficient chromate or molybdate to give a catalyst containing about 6 to 15 per cent of molybdenum or chromium oxides. After adding the promoter the alumina sol is then ready for gelling, for example by allowing it to stand, several hours or days, by forming into droplets in an oil bath, by spraying in air or other drying gas, or by other suitable method to give the desired catalyst. The sol may be dispersed and gelled in droplets to produce "seed alumina" by the spray method shown in an application of James C. Bailie, Serial No. 579,120 (abandoned), filed concurrently herewith. No washing of the gel is required, it being only necessary to dry it and ignite it for the purpose of eliminating organic matter, particularly the organic acids employed in its preparation. The hydrated alumina gel or "hydrogel" may be mixed with silica gel or hydrogel to produce effective cracking catalysts. When gelled in a mass, the alumina hydrogel is a transparent-to-translucent, firm, vibrant jelly or ultragel.

When the sol has been withdrawn from the dissolver B, the dissolver is immediately recharged with a fresh charge of acid from D to produce another batch of sol, the process of dissolving aluminum repeated, and no additional amalgamation of the aluminum being required. In this way the aluminum is gradually used up and the mass of aluminum in the dissolver contracts in volume and settles. When a substantial amount of the aluminum is used up, a fresh charge of aluminum metal is added as hereinabove described and the amalgamation operation is repeated with each fresh charge of aluminum. Mercury adhering to the surface of the aluminum gradually collects in the bottom of the dissolver after the aluminum disappears and is periodically drawn off thru lines 24 and 25 leading to mercury receiver F where the mercury is periodically redissolved by introducing acid, e. g. nitric acid, by line 26. The mercury nitrate produced in this way is transferred at intervals by line 27 back to the mercury solution tank E where it is diluted with water introduced by line 28. It is desirable to prevent mercury escaping thru the outlet line 20 with the sol and for this purpose a shield 29 may be placed over the outlet. Some mercury which remains suspended in the sol may be separated from the sol flowing thru line 21 by diverting it thru centrifuge 30, suitable valves being provided for the purpose. Mercury thus recovered can be returned to the mercury dissolver F. In the semicontinuous operation just described, the dissolvers A, B and C are charged and discharged in rotation so that when one dissolver is discharged, the sol from another dissolver is ready to be discharged immediately, thus providing a continuous stream of freshly prepared alumina sol flowing thru line 21, for continuous gelling operations such as in spray gelling.

The operation may be modified to produce a continuous stream of sol from a single reactor or dissolver with only occasional interruption for recharging with metal, by conducting the acid solution thru the amalgamated aluminum, continuously withdrawing the sol at the top of the dissolver thru manifold 31. Thus, when dissolving the aluminum in C, the acid solution is charged thru lines 17a and 32 and withdrawn thru line 33, thence conducted by line 34 to the gelling apparatus previously described. The acid from D is passed upwardly thru the amalgamated aluminum in C at a sufficiently slow rate to complete the reaction and produce a sol with the desired alumina concentration. The rate of flow of acid to the dissolver may be progressively reduced as the aluminum is used up, the operation being discontinued and the dissolver being recharged with fresh aluminum when the rate becomes too slow to be practical.

An important feature of my process of preparing alumina sol and gel is the use of a large surface of metal in contact with the solution with the result that the sol is formed in a far shorter time than heretofore. I prefer to employ at least 10 square feet of aluminum surface per gallon of dilute acid-sol solution and preferably 15 to 20 square feet per gallon or more. Since this represents a large proportion of aluminum to weak acid, e. g. 750 grams per gallon for 15 square feet when using 28 gage sheet metal, only a part of the metal is dissolved in one charge of acid. By repeating the addition of acid after each batch of sol the metal is eventually entirely consumed.

In still another modification of my process adapted especially to use interrupter continuous operation, I may employ only a single dissolver and add the aluminum continuously or intermittently from a supply in which it is already amalgamated. Apparatus for carrying out the process in this way is shown in Figure 2. Referring to Figure 2, J is the dissolver and K is the amalgamator. Granular aluminum is charged to K and amalgamated by introducing a mercury solution thru line 40, the solution being quickly withdrawn after amalgamation is complete, care being taken to prevent access of oxygen, e. g. by introducing hydrogen thru line 40a. Gate valve 41 is then opened to permit the amalgamated aluminum to fall into the dissolver, the atmosphere in the dissolver having been purged of oxygen.

Weak acid solution is next introduced thru line 42 and passes upwardly thru the aluminum, being converted as it flows into the desired alumina sol which overflows thru line 43 leading to the gelling apparatus. Hydrogen evolved is withdrawn by line 44. The process is continuous, additional aluminum being amalgamated and introduced into the dissolver J as needed to maintain a large excess of metal therein for the purpose of saturating the weak acid solution with alumina and producing the desired concentration of alumina in the resulting sol, usually about 5 per cent $Al_2O_3$ and generally within the range of 3 to 10 per cent. The $Al_2O_3$ content of the sol is easily controlled by controlling the rate of feeding acid.

Another method which I may employ in operating the apparatus shown in Figure 2 involves amalgamating the aluminum in the dissolver J, thus avoiding the step of pre-amalgamation of the metal and avoiding the necessity of handling the pre-amalgamated metal in the total absence of atmospheric oxygen. According to this method of operation, the dissolver J is charged with aluminum and amalgamated as hereinabove described by the addition of an acid solution containing the correct amount of mercury dissolved therein to produce the desired extent of amalgamation. In a typical operation, the aluminum bed is covered with a solution containing 2-3 per cent acetic acid and mercuric acetate containing about 3.0 per cent of mercury, based on the weight of the metal. After amalgamation is complete and all the mercury has been deposited from the solution on the metal, the action of the acid on the metal proceeds rapidly with the formation of alumina sol. When the sol reaction is complete the sol is withdrawn by line 42 at the bottom of the dissolver and additional acid containing mercury is added by line 43, continuously or intermittently, to maintain the level of solution within the dissolver J above the bed of metal therein. Evolution of hydrogen serves to maintain the acid in motion and supply the necessary agitation to prevent gelling of the sol in stagnant areas within the dissolver. Additional hydrogen for agitation may be circulated thru the dissolver by injecting hydrogen thru line 45.

As the supply of aluminum metal in the dissolver disappears, it is replaced periodically or continuously by admitting fresh metal from the chamber K. Freshly added metal need not be amalgamated but it is preferred that air be eliminated from it by purging the chamber K with hydrogen. In purging with hydrogen, it is preferred to introduce the hydrogen at the top thru line 40a and withdraw the air at or near the bottom of the chamber thru line 46. Mercury collecting in the bottom of reactor J is removed at 47.

When agitating the aluminum in dissolver J by injecting additional hydrogen at the bottom thru line 45 as hereinabove described, it is preferred to employ aluminum metal in rather finely divided form, e. g. in the form of granules of 10 to 100 mesh, platelets, shot, etc. By injecting sufficient hydrogen at the bottom, the aluminum metal may be kept in constant state of motion, thus preventing the accumulation on the surface of the particles of high concentrations of alumina sol which might otherwise coagulate or gel and become insoluble thereby resulting in the clogging or obstruction of part of the apparatus, channelling of flow of acid solution, and generally undesirable and erratic operation of the process. When maintaining the aluminum metal in a state of active motion by an upflowing stream of gas, I may employ a dissolving vessel having a generally conical shape, at least in the lower portion thereof. On employing a conical dissolver with the apex at the bottom, the velocity of the upflowing gases diminishes progressively as they flow thru the slurry of metal and acid in the dissolver, reaching a minimum velocity at the surface where the gas is disengaged from the slurry and passes off thru line 44. When using a dissolver of this type and properly controlling the amount of gas introduced at the bottom thereof, the particles of aluminum metal are prevented from settling to the bottom by the higher upward velocity of gases and acid solution at that point caused by the restricted cross-sectional area of the dissolver. It will be apparent that with a conical design of dissolver it is not necessary to employ a perforated screen at the bottom to distribute the flow of gases or support the metal therein. In addition to circulating the hydrogen or instead thereof, I may also circulate the acid thru the aluminum as indicated hereinabove. It is preferred to circulate the acid upwardly at such a rate which will keep the aluminum in agitated suspension. In the absence of hydrogen recycle, an upward velocity of acid of about 40 to 80 feet per minute is satisfactory.

When carrying out the alumina sol reaction by the slurry method rather than the porous bed method, I may conduct the process either continuously or intermittently. In intermittent operation, the amalgamated metal is kept in active movement by the upflowing stream of agitating gas in the presence of the dissolving acid, e. g. 2 to 4 per cent acetic acid. By rapid agitation in this way, the reaction is completed in a short time, e. g. thirty minutes to two hours depending on the degree of subdivision of the metal, temperature and other factors. The agitation is then stopped by shutting off the supply of gas at line 45 and the alumina sol is withdrawn from the dissolver by line 42. When operating in a continuous manner, it is preferred to employ two or more dissolvers in series, continuously passing the weak acid solution thru the dissolvers from bottom to top, allowing the aluminum metal to settle out from the alumina sol at the top of each dissolver. Any aluminum which may be carried along in suspension in the sol is recovered in the next dissolver in the series and the sol reaches the maximum desired concentration in the last dissolver of the series. Any undissolved metal or mercury entrained in the sol may be recovered by filtration or centrifuging before passing the sol to the gelling operation.

The apparatus illustrated in Figure 3 shows a modification of the invention in which a mechanical agitator is provided in the dissolver. Referring to Figure 3, agitator 50 in dissolver L may be a motor driven impeller or other suitable mechanical means providing agitation of the disintegrated aluminum metal. The metal is supplied to the dissolver from amalgamator M, valve 51 being provided for the purpose. In carrying out this operation, the metal is first charged to the amalgamator M and amalgamated therein by forcing in a solution of mercury thru line 52 and one of the connections 53 or 54. Any hydrogen evolved in the amalgamation is conducted away thru line 55. After amalgamation, the acid is withdrawn back to the mercury solution tank N by line 52 and by-pass valve 56, the space occupied by the mercury solution in M being filled with inert gas thru line 55. The amalgamated aluminum is now ready to pass into the dissolver L by opening valve 51, the atmosphere within the dissolver having been previously freed of oxygen and sufficient acid having been added thru line 57 to cover the agitator 50 and enable the freshly added amalgamated aluminum metal to be maintained in suspended condition by the operation of the agitator. By adding the acid in preheated condition, e. g. 150 to 210° F., sufficient heat is supplied to initiate the reaction with the aluminum metal and thereafter the temperature is maintained at the desired point, e. g. 160 to 170° F., by the exothermic heat of the reaction. Cooling may be supplied for regulating the temperature, for example by providing the dissolver L with a cooling jacket thru which cooling fluid may be passed at any desired rate. Hydrogen evolved in the reaction is discharged by line 58.

When the reaction is completed and the desired concentration of aluminum oxide in the sol has been attained, e. g. 5 to 10 per cent, the agitator is stopped and the alumina sol product is withdrawn thru outlets 59 and/or 60 leading to the gelling operation where the sol is converted into the desired aluminum oxide catalyst. Mercury which is dislodged from the surface of the aluminum as it dissolves tends to collect in the bottom of the dissolver and is withdrawn by line 61 leading to the mercury solution tank 62 wherein it is treated with nitric acid or other acid supplied by line 63 to effect re-solution. Gases evolved during the solution of mercury, e. g. hydrogen, nitrogen oxides, etc., are vented by line 64.

In case an undesirable amount of metallic aluminum and mercury are carried out of the system by entrainment in the sol, they may be recovered as hereinabove indicated by filtration or centrifuging. In the continuous operation where the rate of flow of acid thru the bed of aluminum in the dissolver is rather rapid and where the mercury for amalgamation is supplied to the dissolver by adding a mercury salt to the dilute acid supply, it sometimes happens that mercury is also carried out of the dissolver in the form of soluble mercury salt. In this case, I may remove the mercury salt from the sol product by passing the sol thru a bed of granular aluminum which not only acts as a filter to recover any entrained solids but serves to remove dissolved mercury by the replacement reaction. In general, however, this mercury clean-up step is not required, since the aluminum within the dissolver is effective in accomplishing this purpose, particularly when the column of aluminum is sufficiently high to afford proper contact with the solution.

Where the amount of aluminum oxide sol required is not large, it is sometimes convenient to prepare it by employing a rotary dissolver which may be a cylindrical drum rotating on a horizontal axis. Amalgamated aluminum and dilute organic acid are charged to the drum which is then rotated to keep the aluminum in motion and speed up the regular solution. This design of apparatus (not illustrated) is particularly suitable for the solution of irregular shapes of aluminum such as scrap sheet aluminum, wire cuttings, aluminum dross and by-product aluminum of various kinds. After completing the reaction, the rotation of the vessel is stopped while the sol is drawn off and replaced with a fresh charge of dilute organic acid.

In the operation of my process for making alumina sol from amalgamated aluminum metal, it is quite desirable to employ metal of a fairly high degree of purity. It has been found that with impure aluminum and aluminum alloys in general, e. g. alloys with magnesium, copper and heavy metals generally, the rate of reaction is very seriously diminished over that obtained with pure metal. I have found that the process proceeds very well with that grade of aluminum known on the market as "2S" which contains about 99.5 per cent of aluminum. In general it is desirable that the metal employed should have a purity of 98 per cent or higher.

I have found that, by agitating the amalgam as described hereinabove, a greater concentration of $Al_2O_3$ can be obtained in the sol before the action ceases and practical saturation of the sol occurs. Thus sols of maximum concentration are obtained in minimum time. Attempts to increase the concentration of $Al_2O_3$ in the sol above about 10 per cent usually result in gelation, coagulation or precipitation of alumina.

The term "attenuated aluminum" is used herein to denote those forms of metal described hereinabove having a large surface and free space between particles or pieces for flow of acid. It is desirable that the aluminum have such a form and gage that, when piled in a bed it will have a density of at least 3.5 pounds per cubic foot and preferably about 5 to 10 pounds per cubic foot or more. Metal of this density will produce two or more times its volume of sol of better than 5 per cent $Al_2O_3$ concentration with one amalgamation.

Having thus described my process, what I claim is:

1. In the process of making an alumina sol from amalgamated metallic aluminum in a form in which the ratio of surface to volume is about the same as in sheet aluminum, by the action of a dilute weak acid capable of forming a sol with said amalgamated aluminum, the improvement comprising charging said aluminum to a reaction zone and amalgamating it therein by flooding with a solution of a mercury salt, withdrawing said mercury salt solution, flooding the resulting amalgamated aluminum with dilute weak acid, retaining said acid in contact with said aluminum until substantially no further solution of metal takes place and a substantially saturated alumina sol is produced, said metal being only partially dissolved in the operation, withdrawing said alumina sol from the amalgamated aluminum metal, again flooding said mass of amalgamated aluminum metal with an additional quantity of weak acid and producing a further quantity of substantially saturated alumina sol without reamalgamation of said aluminum metal, said aluminum metal being maintained in an oxygen-free atmosphere thruout the operation of repeatedly withdrawing alumina sol and flooding with weak acid.

2. The process of claim 1 wherein the mass of amalgamated aluminum metal in the reaction zone is replenished at intervals by the addition of more aluminum metal, thus maintaining at all times a large excess of amalgamated aluminum above that required for saturating said weak acid.

3. The method of continuously converting attenuated metallic aluminum into an aluminum oxide sol which comprises charging said attenuated aluminum onto the top of a mass of amalgamated attenuated aluminum and passing first thru said freshly charged aluminum and then thru said amalgamated aluminum a solution of a dilute acid capable of dissolving aluminum in the form of an aluminum oxide sol, said acid containing a small amount of a mercury salt, regulating the flow of acid to permit amalgamation of said attenuated metal and formation of aluminum oxide sol, preventing access of atmospheric oxygen to said amalgamated aluminum, and withdrawing from the bottom of said mass the desired alumina sol.

4. The process of claim 3 wherein the flow of acid to said mass and withdrawal of sol therefrom is maintained continuous and at a substantially constant rate to produce a sol containing at least 5 per cent $Al_2O_3$.

5. In the manufacture of alumina gel from an alumina sol prepared by the action of dilute acid on amalgamated aluminum metal wherein amalgamation of said metal is effected by adding a small amount of a mercury salt to said dilute acid before contacting with said metal, the improvement comprising removing residual mercury salt from the alumina sol resulting from said contacting operation before gelling said sol by filtering said sol thru a bed of finely divided aluminum metal, maintained out of contact with atmospheric oxygen.

6. The process of preparing a continuous stream of fresh alumina sol by interaction of amalgamated aluminum metal and a dilute weak acid capable of reacting therewith to produce said sol comprising charging a plurality of dissolving zones with attentuated aluminum metal, amalgamating the metal in one of said zones by flooding with a solution of a mercury salt, quickly withdrawing said mercury solution and replacing it with an oxygen-free atmosphere, then flooding the resulting amalgamated aluminum metal with said dilute acid, retaining said metal in contact with said acid while withdrawing liberated hydrogen therefrom until an alumina sol is obtained with a concentration of about 5 to 10 per cent of $Al_2O_3$, conducting the alumina sol from said reaction zone into said continuous stream of alumina sol, replacing the alumina sol withdrawn from said dissolver with an oxygen-free gas, repeatedly contacting amalgamated aluminum in the said dissolver with dilute acid and withdrawing alumina sol, periodically recharging said dissolver with aluminum metal and amalgamating freshly charged metal as needed, and simultaneously conducting the said operations in the same sequence in another of said dissolving zones in phase relation with the operations in said first-named dissolving zone to provide a supply of fresh alumina sol at intervals alternating with the supply of fresh alumina sol from said first-named dissolving zone.

LLEWELLYN HEARD.

REFERENCES CITED

The following references are of record in the file of this patent:

UNITED STATES PATENTS

| Number | Name | Date |
|---|---|---|
| 2,258,099 | Patrick | Oct. 7, 1941 |
| 2,274,633 | Pitzer | Mar. 3, 1942 |
| 2,328,846 | Pitzer | Sept. 7, 1943 |
| 2,371,237 | Heard et al. | Mar. 13, 1945 |

FOREIGN PATENTS

| Number | Country | Date |
|---|---|---|
| 360,650 | Germany | Oct. 5, 1922 |

OTHER REFERENCES

Mellor, "Inorg. Chem.," vol. 5, page 242.